(12) United States Patent
Woodside et al.

(10) Patent No.: US 6,940,588 B2
(45) Date of Patent: Sep. 6, 2005

(54) MEASURING RESPONSE CHARACTERISTICS OF AN OPTICAL COMPONENT

(75) Inventors: Shane H. Woodside, Ottawa (CA); Yi Liang, Ottawa (CA); Thomas Friessnegg, Ottawa (CA); Paul Colbourne, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 260 days.

(21) Appl. No.: 10/355,150

(22) Filed: Jan. 31, 2003

(65) Prior Publication Data

US 2003/0147067 A1 Aug. 7, 2003

Related U.S. Application Data

(63) Continuation-in-part of application No. 10/081,230, filed on Feb. 25, 2002, now Pat. No. 6,552,782, which is a continuation of application No. 09/404,309, filed on Sep. 24, 1999, now Pat. No. 6,359,685, which is a continuation-in-part of application No. 09/009,924, filed on Jan. 21, 1998, now Pat. No. 6,061,124, which is a continuation-in-part of application No. 08/801,119, filed on Feb. 14, 1997, now Pat. No. 5,896,193.

(60) Provisional application No. 60/355,809, filed on Feb. 13, 2002.

(51) Int. Cl.[7] .................................................. G01B 9/00
(52) U.S. Cl. ..................................... 356/124; 356/73.1
(58) Field of Search ............................... 356/73.1, 124, 356/125, 515

(56) References Cited

U.S. PATENT DOCUMENTS 6,552,782 B2 * 4/2003 Colbourne et al. .......... 356/124

* cited by examiner

Primary Examiner—Andrew H. Lee
(74) Attorney, Agent, or Firm—Teitelbaum & MacLean; Neil Teitelbaum; Doug MacLean

(57) ABSTRACT

A system for determining response characteristics, insertion loss and group delay, of an optical component by applying a sweeping wavelength optical signal that is modulated with an RF signal, measuring the insertion loss and group delay at a series of wavelengths and correlating the measurements to wavelengths. A method for synthesis of an effective modulation frequency in determining the group delay response characteristics of an optical component by obtaining a series of measurements over a sample optical spectrum using a given modulation frequency and calculating a weighted average of the group delays in the series of measurements giving a result substantially equivalent to a measurement taken using a modulation frequency equal to the effective modulation frequency.

24 Claims, 13 Drawing Sheets

MEASURING RESPONSE CHARACTERISTICS OF AN OPTICAL COMPONENT

CROSS-REFERENCE TO RELATED APPLICATION

The present application claims priority from U.S. provisional application Ser. No. 60/355,809 filed Feb. 13, 2002 and is a continuation-in-part of U.S. patent application Ser. No.10/081,230 filed Feb. 25, 2002, now U.S. Pat. No. 6,552,782, which is a continuation of U.S. patent application Ser. No. 09/404,309 filed Sep. 24, 1999, now U.S. Pat. No. 6,359,685 issued Mar. 19, 2002, which is a continuation-in-part of U.S. patent application Ser. No. 09/009,924 filed Jan. 21, 1998, now U.S. Pat. No. 6,061,124 issued May 9, 2000, which is a continuation-in-part of U.S. patent application Ser. No. 08/801,119 filed Feb. 14, 1997, now U.S. Pat. No. 5,896,193 issued Apr. 20, 1999. All of the above referenced documents are incorporated herein by reference.

TECHNICAL FIELD

The present invention relates to the field of measuring (testing) the response characteristic of optical components, and in particular to the measurement of insertion loss and group delay in optical components.

BACKGROUND OF THE INVENTION

There are several ways of testing an optical component for loss and other characteristics. For example, a single optical signal of known wavelength and amplitude can be launched into a component, and losses can be deduced from a signal measured at the output of the device. Alternatively, a plurality of signals can be launched into the device sequentially and similar measurements made for each wavelength. In a manufacturing and production environment, it is preferable to test devices over a range of wavelengths of interest as quickly as possible. Generally, a testing station for testing optical components requires a very costly tunable laser. In operation, these lasers are tuned to a plurality of wavelengths, one at a time, and have their output signal fed into a device under test (DUT). The purpose of providing a signal to a DUT at various wavelengths within a predetermined range of wavelengths, is to detect losses through the DUT at each or at several wavelengths of interest. Of course it would be possible to provide signals from several discrete lasers to a DUT, however, in a production environment, such a scheme would likely not be practicable. When using a tunable laser as mentioned above, it is preferred if electronic circuitry is provided to correlate an output response for the DUT with a particular wavelength of light propagating through the device at a particular instant in time.

Systems are currently known that employ a tunable laser in which the tuning mechanism stops at each wavelength to be tested. However, this process takes several minutes when a large number (i.e. >100) of wavelengths are to be measured. The wavelength accuracy is limited by the mechanical tolerances of the tuning mechanism.

An object of the present invention is to overcome the shortcomings of the prior art by providing a testing device that transmits a modulated variable wavelength test signal to a DUT to obtain testing information relating to group delay, while providing an independent timing information signal, which is correlated with the group delay information.

SUMMARY OF THE INVENTION

Accordingly, the present invention relates to an apparatus for testing an optical component comprising;

a tunable laser for providing a tunable laser signal having a wavelength that varies with time;

a first modulator for modulating the tunable laser signal producing a modulated laser signal defined by frequency, amplitude, and phase;

an information signal generator for generating an information signal having an indicator that varies with the variations in wavelength of the tunable laser signal;

a test station for receiving the modulated laser signal, and for testing the optical component therewith, providing a plurality of test information samples including an initial and a final phase measurement of the modulated laser signal taken before and after passing through the optical component, respectively, to calculate group delay at various times and corresponding wavelengths; and a correlator for correlating the plurality of test information samples with the information signal to determine the wavelength corresponding to each test information sample independent of the specific optical component.

Another aspect of the present invention relates to a method for testing an optical component, comprising the steps of:

a) providing a first optical signal that varies in wavelength over time;

b) generating a second signal that has an indication therein related to variations in wavelength and time of the first optical signal;

c) modulating the first optical signal providing a modulated optical signal defined by a frequency;

d) testing the optical component with at least a portion of the modulated optical signal to acquire test information comprising initial and final phase measurements for calculating group delay measurements at a plurality of wavelengths;

e) deriving wavelength information relating to the first optical signal, or a signal derived therefrom, from the second signal; and f) correlating the acquired test information with the derived wavelength information to match the test information with a corresponding wavelength independent of the optical component.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
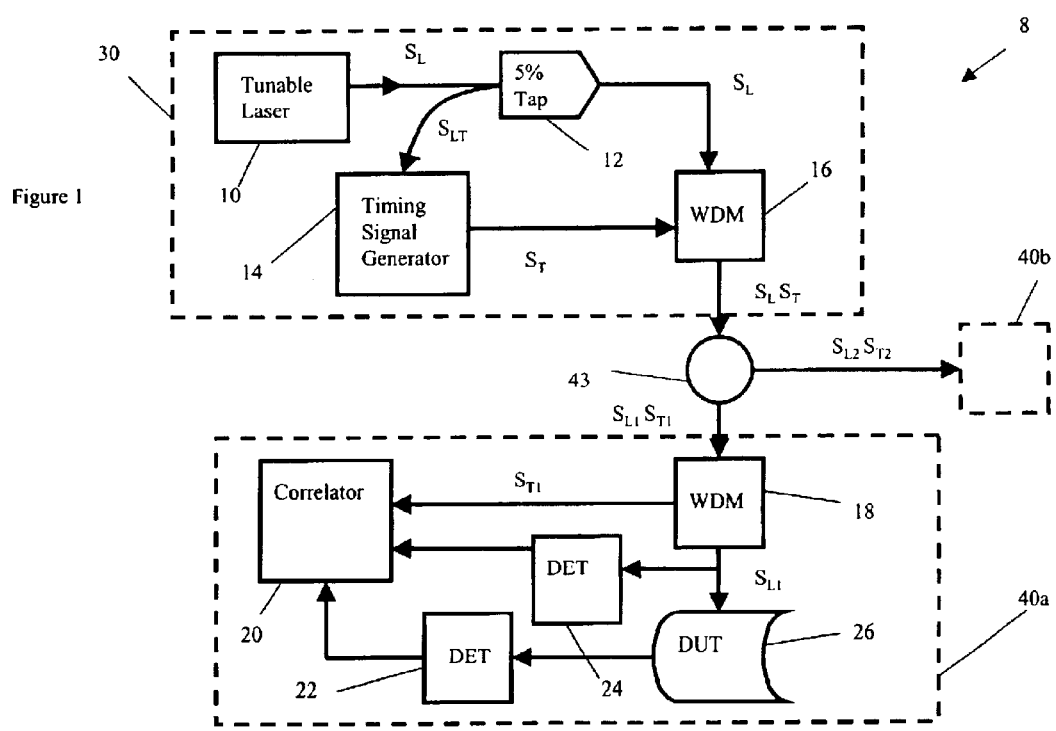
FIG. 1 is a schematic block diagram of a test system wherein a laser signal and timing signal generator block provide signals to a test station block for testing an optical device.
Figure 2:
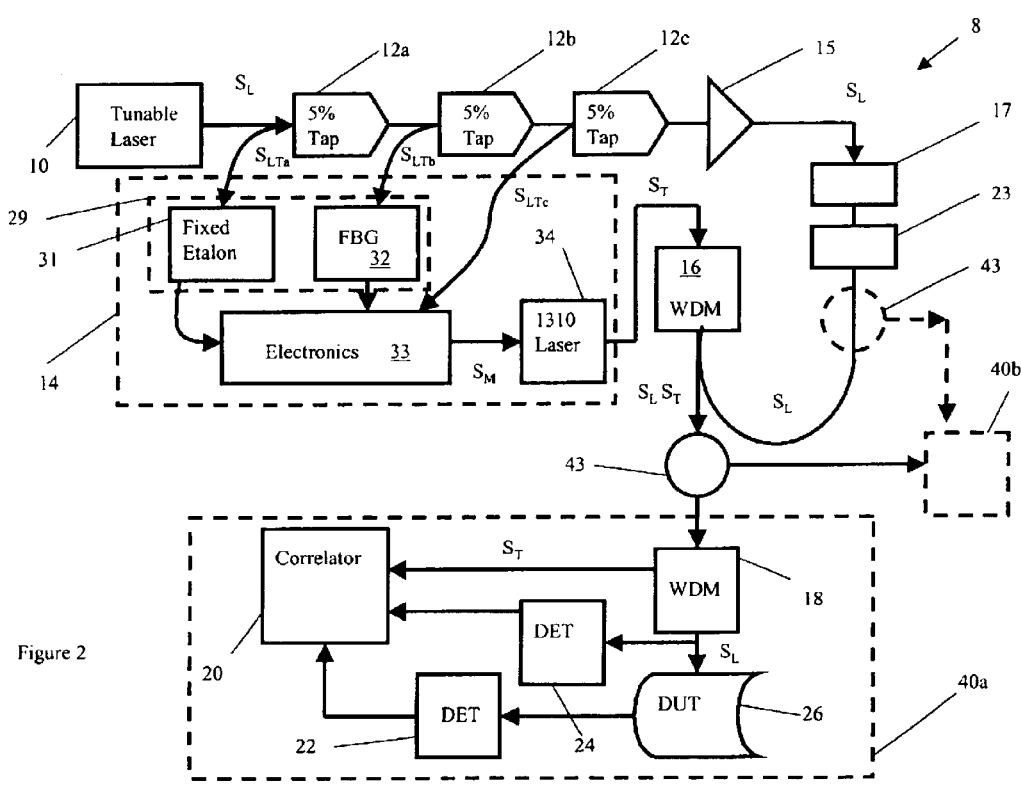
FIG. 2 is a schematic block diagram of a laser signal and timing signal generator block providing signals to multiple test stations.

With reference to FIGS. 1 and 2, a basic test system 8 for measuring insertion loss at various wavelengths is illustrated, wherein a first block 30 of optical circuitry and components provides a variable wavelength optical signal for launching into a DUT 26 within a second block 40a. In the first block 30, the variable wavelength optical signal in the form of a tunable laser signal $S_L$ is combined with a timing signal $S_T$ for determining wavelength information relating to the tunable laser signal $S_L$. The purpose of separating the circuitry into these two blocks 30 and 40a is to isolate and separate two primary functions: firstly, that of producing a variable wavelength optical signal $S_L$ with an associated timing signal $S_T$ for providing timing information relating to the variable wavelength optical signal $S_L$, and secondly, the function of testing the device or component of interest along with providing the necessary circuitry for doing so in response to the two signals $S_L$ and $S_T$. Furthermore, the separation into these two blocks has significant cost advantages as well. For example, by using a splitter 43 to split the variable wavelength optical signal $S_L$ along with its corresponding timing signal $S_T$ into two same signals, another test station 40b identical to block 40a can be provided with test and timing signals. Since the most costly part of the entire system 8 is in the block 30 containing the tunable laser, this system obviates the requirement of providing duplication of the tunable laser to provide test signals to two or more separate test stations.

Referring now in more detail to the system 8, block 30 includes a tunable laser 10 capable of being tuned over a wavelength range of interest from a first wavelength $\lambda_A$ (e.g. 1520 nm) to a second wavelength $\lambda_B$ (e.g. 1570 nm). The tunable laser 10 repeatedly varies its output starting at $\lambda_A$ increasing continuously to $\lambda_B$. After reaching $\lambda_B$ the laser returns to $\lambda_A$ and continues from $\lambda_A$ again. Thus the laser sweeps across the wavelength range, and continues repeatedly. A 5% tap 12 receives the output signal $S_L$ from the laser 10 and passes 5% $S_{LT}$ to a timing signal generator 14, while passing 95% of the optical signal $S_L$ onwards to a means 16 of combining this signal with a timing signal $S_T$. Coupling ratios other than the 5/95 ratio described above can alternatively be used. From the small portion $S_{LT}$ of the output signal $S_L$, the timing signal generator 14 determines when the signal $S_L$ is at a predetermined wavelength, for example, when its wavelength is $\lambda_A$. Then the timing signal generator 14, generates the timing signal $S_T$, which indicates that the signal $S_L$ is at a wavelength of $\lambda_A$. At a subsequent time when the laser wavelength reaches the next wavelength of interest $\lambda_A+\Delta\lambda$ (e.g. $\Delta\lambda$=0.01 nm) a subsequent pulse in the timing signal $S_T$ is sent indicating a wavelength of $\lambda_A+\Delta\lambda$ (e.g. 1520.01 nm). As both of the signals $S_L$ and $S_T$ are combined by a coupling means 16, e.g. a WDM filter, care is taken to ensure that the timing signal $S_T$ is at a wavelength that differs from the signal $S_L$ so that the data content of the signal $S_L$ is not affected. Essentially, the timing signal $S_T$ serves as a marker or indication which can be used by the block 40a, and more particularly the means for determining wavelength information 20 to calibrate the wavelength of the signal $S_L$ at specific times corresponding to the timing signal $S_T$. Conveniently a splitter 43 is provided to split the signals $S_L$ and $S_T$ into other signals, e.g. $S_{L1}$ and $S_{T1}$, $S_{L2}$ and $S_{T2}$, $S_{L3}$ and $S_{T4}$, that can be routed to one or more other test stations, e.g. 40b, 40c, 40d (only one of which is shown). Of course alternatively, the timing signal could be an electrical signal distributed by electrical means.

The second block 40a includes means in the form of a wave division multiplex (WDM) filter 18 for separating the composite signal $S_{L1}$ and $S_{T1}$ into two separate signals. The signal $S_{T1}$ is provided to the means for determining wavelength information 20, which also receives information from detectors 22 and 24. Of course several detectors 22 can be included for simultaneously detecting the output of a multi-output DUT such as a WDM filter. A large fraction (e.g. 90%) of the signal $S_{L1}$ output from the filter 18 is provided to the DUT 26; a small portion (e.g. 10%) is provided to the detector 24. The output signal from the DUT 26 is directed to the detector 22. In operation the detector 24 relatively determines the intensity of the input signal to the DUT 26 and provides this information to the correlator means 20. The actual intensity, or power, measured at the output of the DUT 26 is provided by the detector 22 to the correlator means 20. Thus the correlator means 20 can calculate the loss through the DUT 26 and can determine the corresponding wavelength of the signal $S_L$ for that particular loss calculation, in dependence upon the timing signal $S_T$. Since the timing signal $S_T$ indicates the instant the signal $S_L$ is at a wavelength of $\lambda_A$, a determination can be made as to the wavelength of the signal $S_L$ at other instants in time. An embodiment for realizing this function will be described in more detail with reference to FIG. 2.

Figure 4:
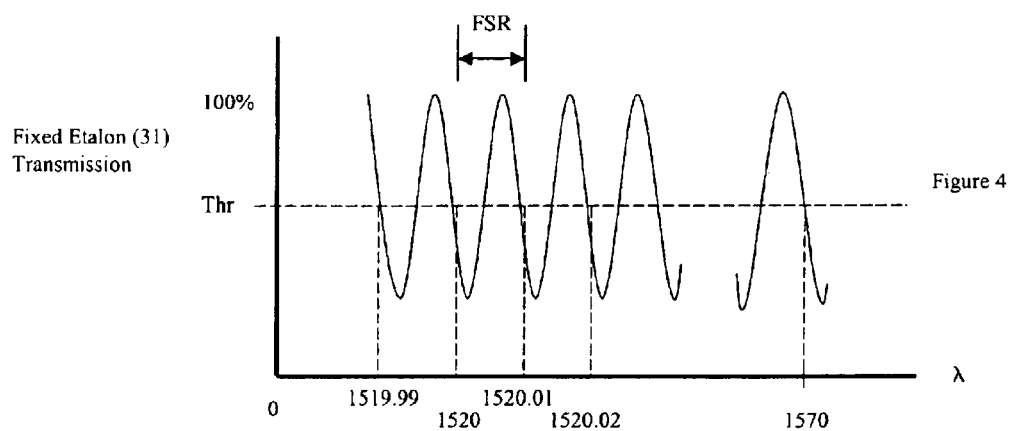
FIG. 4 is a graph showing the output characteristics of an etalon in accordance with this invention.

Referring specifically to FIG. 2, which illustrates a preferred embodiment of the timing generating circuit 14, a small portion of an output signal $S_L$ of the tunable laser 10 is tapped by 5% optical taps 12a 12b and 12c, for providing three tap signals $S_{LTa}$, $S_{LTb}$ and $S_{LTc}$ that are provided to the timing signal generation circuit 14. Within this circuit 14, a fixed etalon 31, a fiber Bragg grating (FBG) 32 and electronic circuitry 33 provide a means of generating a pulsed modulation signal $S_M$ comprising a train of pulses having $\lambda\Delta$ (e.g. 0.01 nm) increments in wavelength of the signal $S_L$. The first pulse in the train of pulses, derived from the output of the FBG 32 and the output of the fixed etalon 31, corresponds to the signal $S_L$ being at a wavelength of $\lambda_A$; the second pulse corresponds to the signal $S_L$ being at a wavelength of $\lambda_A+\Delta\lambda$; the third pulse corresponds to the signal $S_L$ being at a wavelength of $\lambda_A+2\Delta\lambda$, and so on, and the last pulse in the train of pulses, corresponds to the signal $S_L$ being at a wavelength of $\lambda_B$. Since the input signal $S_{LTa}$ to the fixed etalon 31 varies in wavelength, and the etalon 31 is selected to have a free spectral range FSR of, for example, 1.25 GHz or about 0.01 nm (i.e. equal to $\Delta\lambda$) within the range of $\lambda_A$ to $\lambda_B$, the output signal of the fixed etalon 31 is a periodic signal. FIG. 4 shows the desired output characteristic of the etalon 31. The distance between etalon reflective surfaces is calculated as follows:

Etalon FSR[nm]=$\lambda^2$/2nd

Etalon FSR[GHz]=c/2nd where c=the speed of light; n=the refractive index of the material between the reflective surfaces; and d=the distance between etalon reflective surfaces.

Figure 3:
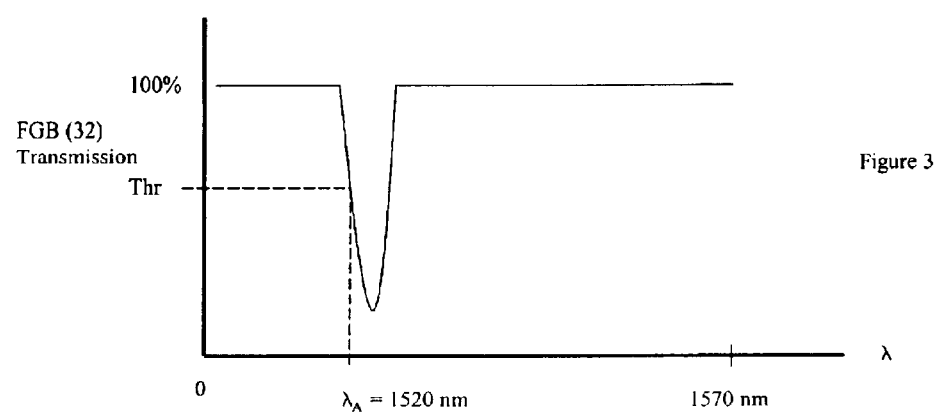
FIG. 3 is a graph showing the output characteristics of a fibre Bragg grating.

The FBG 32 is designed to reflect the input signal when its wavelength is 1520 nm, thus providing an indication to the circuitry corresponding to a starting point, in the train of pulses. This is illustrated in FIG. 3 where at the threshold transmission level, i.e. the start, is indicated to be at $\lambda_A$. The electronic circuit 33 in response to the periodic output from the etalon 31 and the indication of when the signal $S_L$ is at a wavelength of $\lambda_A$, generates the modulation signal $S_M$ that is provided to a 1310 nm laser. In response to the signal $S_M$ the laser generates a train of pulses, at a wavelength of 1310 nm, spaced apart in time corresponding to $\Delta\lambda$ wavelength increments of the tunable laser signal $S_L$. Thus, the modulation signal is converted to a 1310 nm laser pulsed signal $S_T$ having a wavelength significantly different from the signal $S_L$ that varies between $\lambda_A$ and $\lambda_B$. Before the signals $S_T$ and $S_L$ are combined, the signal $S_L$ is amplified by an erbium doped fibre amplifier (EDFA) 15. The EDFA 15 may be necessary to ensure that there is sufficient optical power at each test station to perform the loss measurement on the DUT. A tunable filter 17 tracks the laser wavelength, transmitting the laser signal but blocking the spontaneous emission of the EDFA or laser at wavelengths other than the laser wavelength.

A wavelength division multiplexor 16 combines the amplified signal $S_L$ and the signal $S_T$ into a composite signal $S_L S_T$ that is fed to a 1 by 8 splitter 43 thereby providing 8 test signals. Thus, 8 test stations 40a, 40b ... 40h can be provided at different locations within a building, with the required signals and signal information with which to test optical devices. Using the device shown in FIG. 2, it takes approximately 1 second to test a DUT at a plurality of wavelengths from, for example, 1520 nm to 1570 nm in increments of about 0.01 nm, which corresponds to approximately 5000 data points.

In the circuit 14 of FIG. 2, an etalon 31 is used as a means of providing a periodic signal as the input signal sweeps from $\lambda_A$ to $\lambda_B$. Of course the etalon 31 may be substituted with other suitable interferometric means. Further the FBG 32 is used as a means of acquiring a relatively precise indication of its input signal being at $\lambda_A$. Once again, various other means can be envisaged for indicating when the input signal is at $\lambda_A$ or any other reference wavelength. The fixed etalon 31 and FBG 32 have been chosen in the preferred embodiment after considering cost and availability. Preferably, temperature stabilization means 29 are provided to ensure that the output of the characteristics of the etalon remain as constant as possible.

The timing signal $S_T$ need not be combined with the tunable laser signal $S_L$. Instead a second optical fiber, or a wire, can be use to transmit the timing signal to each test station. The signals are combined in the preferred embodiment to simplify the distribution of the signals among the test stations or, alternatively, the tunable laser itself can be modulated to transmit the timing signal.

The laser signal $S_L$ can be distributed to many more than 8 test stations. The limiting factor is that sufficient optical power be present at detectors 22 and 24 to perform the loss and group delay measurement. If necessary, the laser signal $S_L$ could be split after 17, and re-amplified and split again. In this way an unlimited number of test stations can operate from one tunable laser (with multiple timing signals $S_T$ provided.)

In FIG. 2 an optional polarization state controller 23 is shown that imparts a polarization state to the laser signal $S_L$ transmitted to the DUT. By using this controller 23, the system can additionally measure polarization dependent loss (PDL) at each wavelength. The controller 23 is set to one of 4 polarization states and one wavelength sweep is made, measuring the loss of the DUT at each wavelength for that particular state of polarization. The controller 23 is then set to the second polarization state and a second wavelength sweep is made. At each wavelength, 4 polarization states can be used to calculate the average loss (over all polarization states) and the PDL. A system and method of measuring polarization dependent loss, onto which the implementation just described is based, can be found in U.S. Pat. No. 5,371,597, issued Dec. 6, 1994 to Favin et al. The controller 23 can be placed directly after the tunable filter 17, thereby further economizing and obviating the need to have a polarization state controller 23 at each station.

Figure 5:
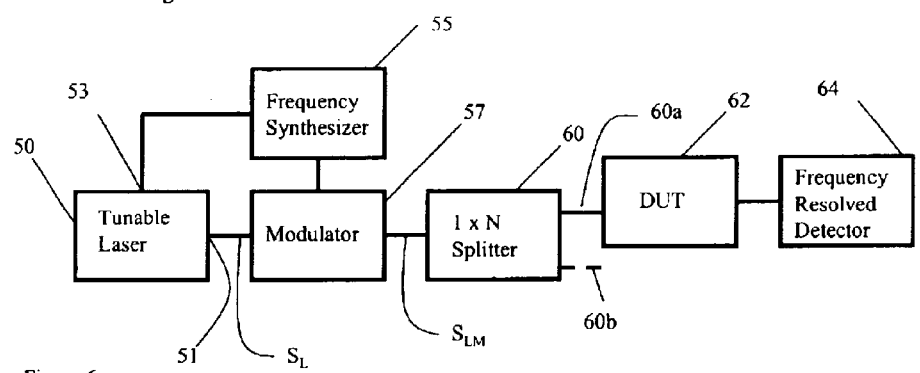
FIG. 5 is a block circuit diagram of an alternative embodiment of the test system including circuitry for FM modulation and demodulation of a timing signal.

Referring now to FIG. 5 an alternative embodiment of the present invention in which the tunable laser signal $S_L$ is modulated with the timing information instead of using a separate timing signal $S_T$. A tunable laser 50 has a port 53 for receiving or providing a synchronization control signal and an output port 51 for providing a variable wavelength optical signal in the form of a tunable laser signal $S_L$. A frequency synthesizer 55 is responsive to a synchronization control signal provided by the tunable laser 50. Upon receiving a start pulse, the frequency synthesizer 55 begins providing a modulator 57 with a frequency synthesized signal for modulation with tunable laser signal $S_L$, thereby providing an encoded or frequency modulated laser signal $S_{LM}$ in the form of a frequency ramp indicative of the varying wavelength of the laser signal $S_L$. The signal $S_{LM}$ is then provided to a 1×N splitter 60 having outputs 60a to 60n. As is shown in FIG. 5, the output 60a is provided to a device under test (DUT) 62 after which the output signal having propagated through the DUT 62 is analyzed. The signal is first demodulated removing the critical wavelength information or instantaneous wavelength signature, and retrieving the relevant test information from the demodulated signal $S_L$ Alternatively, the signal $S_{LM}$ can be demodulated prior to being provided to the DUT 62. In another preferred alternative, demodulation would not be required and the wavelength information encoded in the modulated signal would be detected, for example by a frequency resolved detector 64 that includes a frequency counter that measures the instantaneous frequency. Alternatively, a local oscillator and a mixer can be used to convert the modulated frequency to a baseband voltage signal.

Figure 6:
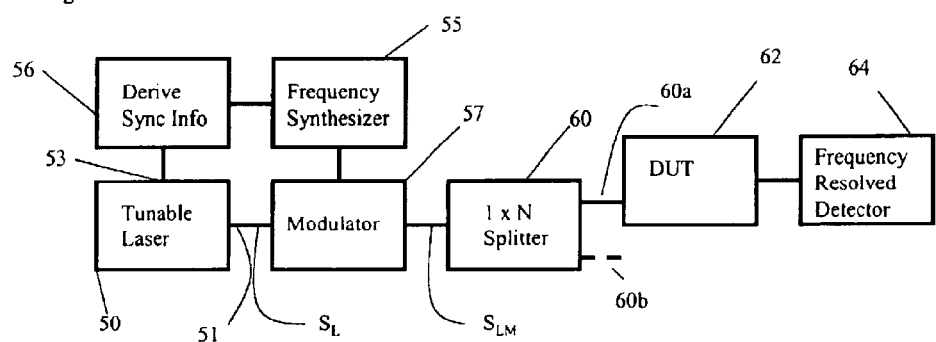
FIG. 6 is a block circuit diagram similar to that of FIG. 5 and including means for deriving synchronization information relating to the scanning laser output signal wavelength.

In FIG. 6 means 56 are shown disposed between the laser 50 and the frequency synthesizer 55 for deriving and providing wavelength information to the frequency synthesizer 55 from a signal provided by the tunable laser 50 that corresponds in wavelength to the signal $S_L$.

Figures 7A, 7B:
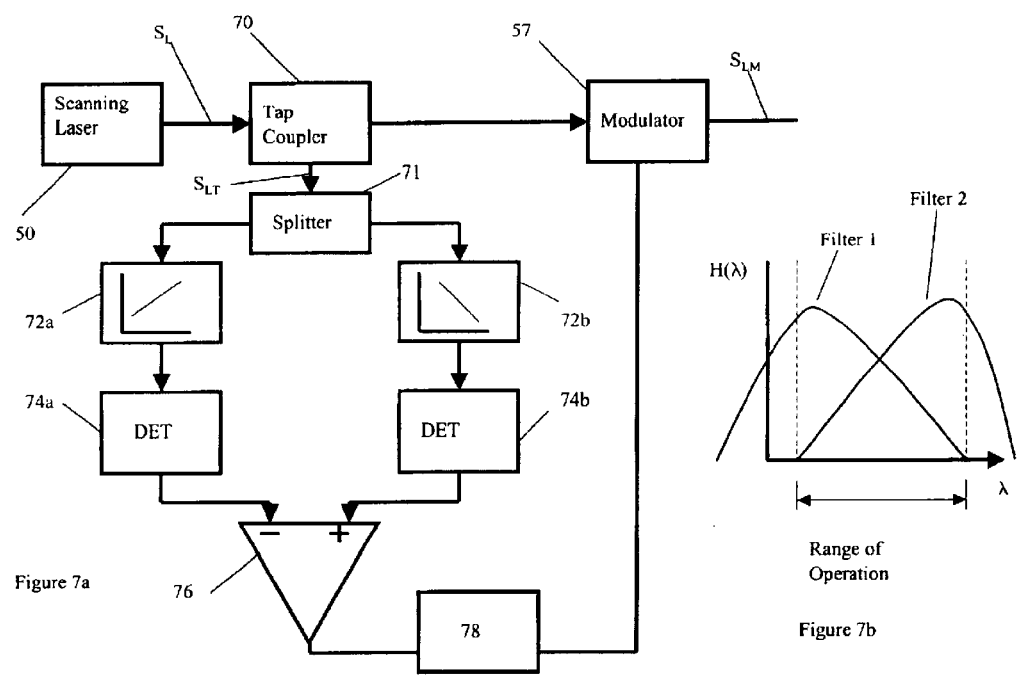
FIG. 7a is a detailed block circuit diagram of a circuit for deriving synchronization information and for modulating the scanning laser output signal with wavelength information.
FIG. 7b is a graph of two filters output responses depicting wavelength versus amplitude.

Referring now to FIG. 7a a portion of the system shown in FIG. 6 is illustrated in greater detail. At the output of the scanning laser 50, a small portion $S_{LT}$ of the signal $S_L$ is extracted by a tap coupler 70. Two matched filters 72a and 72b are disposed to receive a same portion of the tapped signal $S_{LT}$ from a 50:50 splitter 71, and two detectors 74a and 74b respectively are disposed to receive output signals from the filters 72a and 72b. Regions of the filters having opposite (negative and positive) slopes are used. A differential amplifier 76 is electrically coupled to receive output signals from the detectors 74a and 74b and to provide a signal to a modulator 57 that is proportional to the instantaneous wavelength of the signal $S_L$. If required, a linearizing network 78 may be disposed between the differential amplifier 76 and the modulator 57.

FIG. 7b illustrates the output response of the two optical filters 72a and 72b and the region of the filters between the two vertical dashed lines shown that is used to achieve the advantages of this embodiment.

In operation, the circuit of FIG. 7a works in the following manner. The signal $S_{LT}$ is tapped from the tunable laser output signal $S_L$ and is split substantially equally between the two filters 72a and 72b. The power detected by detectors 74a and 74b is provided to the differential amplifier 76, which provides an output signal that is substantially proportional to the wavelength of the signal $S_L$ This output signal may be linearized if required and then provided to a system to modulate the wavelength proportional signal with the signal $S_L$. This modulated swept laser signal $S_{LM}$, which includes its near instantaneous wavelength information, is then provided to a device under test. Alternatively, as was heretofore described, the wavelength information can be multiplexed onto another optical carrier at an alternative wavelength using either digital or analog modulation techniques.

Figure 8:
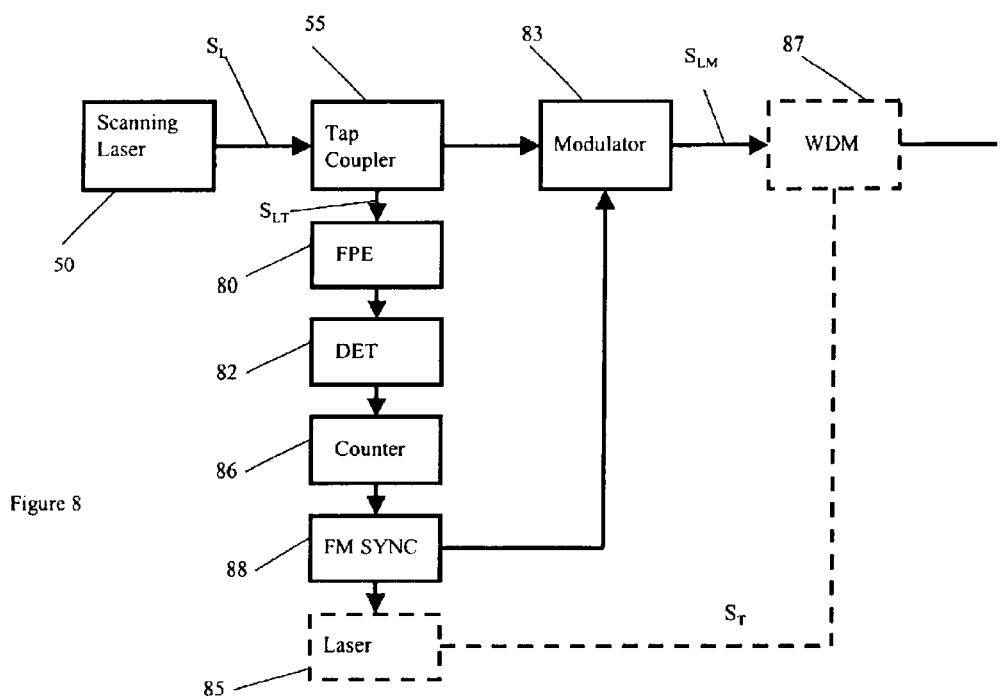
FIG. 8 is a detailed block circuit diagram of an alternative circuit for deriving synchronization information and for modulating the scanning laser output signal with wavelength information.

Turning now to FIG. 8 a circuit providing electronic synthesis of wavelength information is provided to communicate nearly instantaneous wavelength information of swept or changing signal $S_L$ to an optical receiver not shown. In this embodiment the signal $S_L$ is tapped and the tapped signal $S_{LT}$ is provided to a Fabry-Pérot etalon 80 that generates optical pulses to a detector 82. The free spectral range of the etalon must be selected so as to include peaks at a plurality of tunable wavelengths of interest. An electronic counter 86 counts the number of pulses from the known start of a wavelength scan. A frequency synthesizer 88, in response to the counted value in the counter 86, converts the number of pulses stored by the counter into a nearly instantaneous frequency corresponding to the frequency of the signal $S_L$ As described heretofore, this signal can be used to modulate the swept signal $S_L$ via a modulator 83. Alternatively, as shown in broken line in FIG. 8, the wavelength information can be fed to a laser 85 to produce an optical signal $S_T$, which can be multiplexed onto the same optical carrier by a WDM filter 87 at an alternative wavelength or onto another optical carrier (not shown) using either digital or analog modulation techniques.

Figure 9:
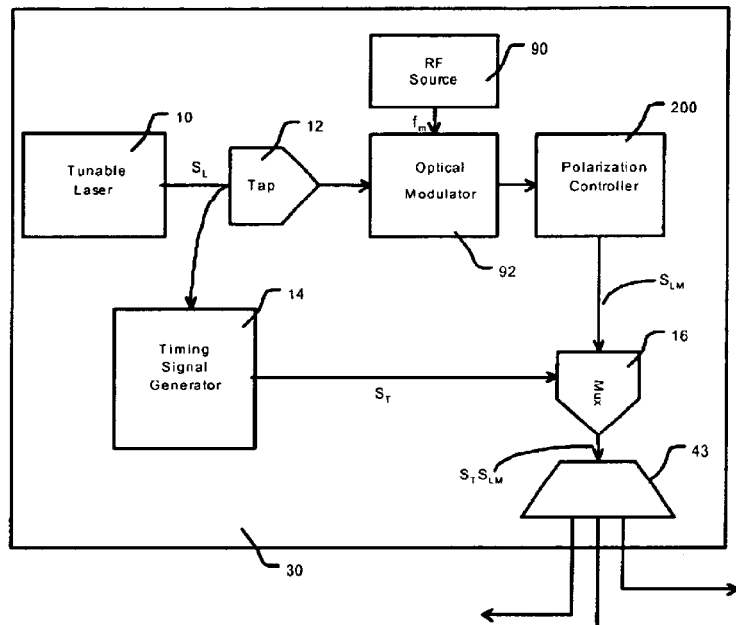
FIG. 9 is a schematic block diagram of an embodiment of a system for determining the response characteristics of an optical device of the present invention.
Figure 9:
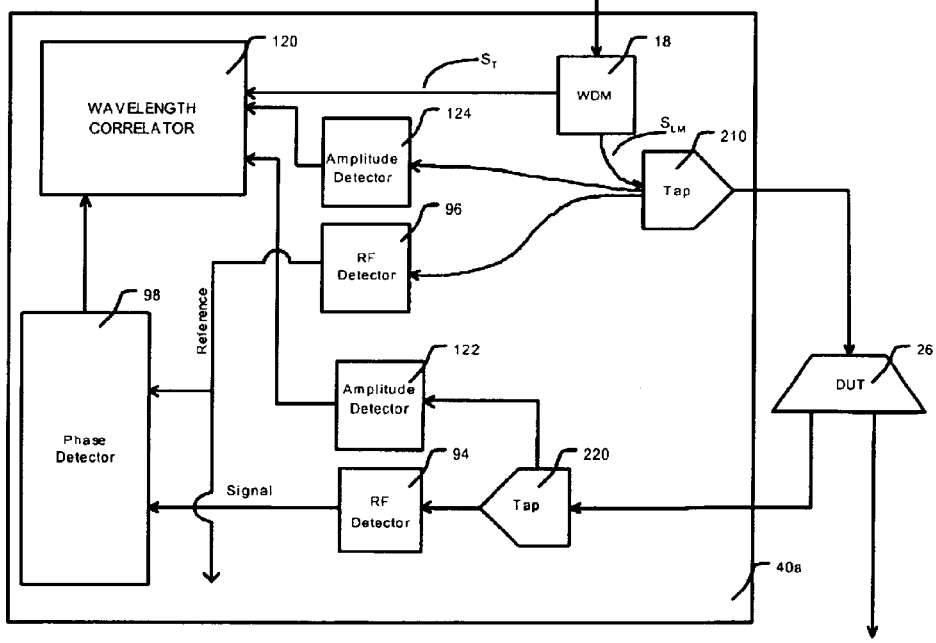

Another embodiment of the present invention for determining the response characteristics of an optical device 26 is represented in FIG. 9. The response characteristics of the optical component can include insertion loss, PDL, group delay and differential group delay measurements at a series of wavelengths over a sample optical spectrum. In a manner similar to that described for the embodiment represented in FIG. 1, a tunable laser 10 outputs a sweeping wavelength laser signal $S_L$ that is combined with a timing signal $S_T$. Before being multiplexed with the wavelength identification information contained in $S_T$ via WDM means 16, the laser signal $S_L$ is amplitude modulated by an optical modulator 92 as is done in the well known conventional modulation phase technique. In a preferred embodiment, the modulation frequency $f_m$, as generated by a radio frequency (RF) source 90 is adjusted to match the frequency increments of the timing signal as described below. Additionally, before being combined with $S_T$ the polarization of $S_{LM}$ can be controlled by an optional polarization controller 200, which applies a polarization state to the signal $S_{LM}$ A test signal comprising the sweeping signal $S_{LM}$, modulated, optionally polarization conditioned and combined with the timing signal $S_T$ is supplied, by block 30 (i.e. the test signal source) to one or more measurement stations via a splitter 43. A measurement station 40a recovers the timing signal $S_T$ via a WDM filter 18 and supplies, via a tap 210, a portion of the sweeping signal $S_{LM}$ to an amplitude detector 124 that outputs a reference amplitude. An additional portion of the sweeping signal $S_L$ is used for reconstructing a reference RF signal via a RF detector 96. The remaining portion of the sweeping signal $S_{LM}$ is applied to a DUT 26. An output of the DUT 26 is split, via a tap 220, and applied to an amplitude detector 122, to output a signal amplitude, and to an RF detector 94, to extract an RF signal. The RF signal plus the reference RF signal are input to a phase detector 98, that outputs the relative phase difference (i.e. group delay measurement) between the sweeping signal $S_L$ input to and the signal output from the DUT 26. The reference amplitude, the signal amplitude and the phase difference are captured and correlated with the wavelength timing signal by a wavelength correlator 120 thereby determining and capturing the insertion loss measurement and group delay measurement versus wavelength over a series of wavelength (frequencies) sweeps by the signal $S_L$.

The use of the amplitude detectors 122, 124 and the associated signal taps 210, 220 as represented in FIG. 9 is not required as the RF detectors 94, 96 can be used to obtain amplitude information as well as phase information. The previously described embodiment of FIG. 9, with separate amplitude and RF detectors, allows for the amplitude detectors 122, 124 to be of a low frequency type optimized for the requirements of insertion loss measurement and for the RF detectors 94, 96 to be optimized for requirements of low noise phase measurement.

As an alternative (not illustrated) to the use of separate amplitude and RF detectors, a single detector can be used in conjunction with a simple electrical coupling network (similar to a cross-over circuit used in a multi-driver loud speaker) to pass the low frequency average photocurrent to an amplitude detection circuit while directing the RF photocurrent to a high-frequency circuit. The use of a single detector in conjunction with a simple electrical coupling network provides features similar to the embodiment of FIG. 9 comprising separately optimized RF detectors 94, 96 and amplitude detectors 122, 124, while comprising less optical components resulting in higher signal levels at the (photo) detectors.

Although not illustrated in FIG. 9, in the case of a multi-channel output DUT 26, each additional output can be simultaneously measured using an additional set of components comprising a tap 220, an RF detector 94 and an amplitude detector 122 for each additional output. The outputs of the additional RF detectors 94 and the additional amplitude detectors 122 are input to the phase detector 98 and the wavelength correlator 120, respectively, in order to determine and capture multiple group delay and insertion loss measurements.

The splitter 43 allows the test system of the present invention to be capable of supporting multiple measurement stations in parallel. This provides a capability to test many DUT 26 in a single wavelength sweep, while requiring only one tunable laser 10, optical modulator 92 and polarization controller 200.

The optional polarization controller 200 allows for the basic measurement of insertion loss and group delay versus wavelength to be captured over a range of polarization states. The polarization controller 200 is capable of applying a polarization state using a method well known in the art—for example, a polarizer and a $\lambda/4$ retarder plate followed by a $\lambda/2$ retarder plate. Polarization Dependant (insertion) Loss (PDL) and Differential (polarization dependent) Group Delay (DGD) can be measured using the "All-States" approach, in which the group delay and insertion loss are captured at multiple polarization states. The PDL is given by:

PDL=$IL_{max}$–$IL_{min}$; where $IL_{max}$ and $IL_{min}$ are the maximum and minimum Insertion Losses (IL) measured over the range of polarization states respectively.

While DGD is given by:

DGD =$GD_{max}$–$GD_{min}$; where $GD_{max}$ and $GD_{min}$ are the maximum and minimum Group Delay (GD) measured over the range of polarization states respectively.

In general, the "All-States" technique requires many scans because of the number of polarization states required for accurately determining the minimum and maximum conditions. A much more efficient approach can be achieved by generating a specific combination of four polarization states, known as a Mueller set, to calculate PDL as described in U.S. Pat. No. 5,371,597, Favin et al, issued Dec. 6, 1994. An analogous four-state technique for DGD has been described in "Modulation phase-shift measurement of PMD using only four launched polarization states: a new algorithm", P. A. Williams, ELECTRONICS LETTER, Vol. 35, No. 18, Sep. $2^{nd}$, 1999 is summarized as follows. By illuminating a (DUT) with linearly polarized light at 0°, 45°, 90° and circularly polarized (circ) light, and by measuring the phase of the light at the output of the DUT for each of the aforementioned states of polarization we obtain the phase signals $\phi_0$, $\phi_{45}$, $\phi_{90}$ and $\phi_{circ}$ respectively. From these phase signals we can then calculate an average group delay $$\langle GD \rangle = \frac{\Phi}{2\pi f} = \frac{(\varphi_0 + \varphi_{90})/2}{2\pi f}$$

and a differential group delay $$DGD = \frac{1}{2\pi f}\left\{2\tan^{-1}\left[\left(\tan^2(\varphi_0 - \Phi) + \tan^2(\varphi_{45} - \Phi) + \tan^2(\varphi_{circ} - \Phi)\right)^{1/2}\right]\right\}$$

where f is the RF modulation frequency and $\Phi$ is the polarization-independent phase offset.

In order to calculate the group delay, the tunable laser signal $S_L$ is modulated in amplitude with a sinusoidal waveform at a radio/microwave frequency $f_m$, typically in the range of 100 MHz to 3 GHz. Phase measurements $\phi_1$, $\phi_2$, $\phi_3$, . . . are recorded at discrete wavelengths $\lambda_1$, $\lambda_2$, $\lambda_3$, . . . corresponding to optical frequencies $f_1$, $f_2$, $f_3$, . . . The phase is a relative measurement, and in this case the frame of reference is the RF signal applied to the optical modulator 92. The correlator 120 can then calculate the group delay by the following equation:

$$\text{Group Delay}_i(\text{ps}) = \frac{\varphi_i}{360 f_m} \times 10^{12}$$

In which $\phi$ is in degrees and $f_m$ is in Hz.

The above-identified group delay calculation is effectively an average of the group delay at exactly wavelength $\lambda_i$. For a given accuracy and resolution of phase measurement, the group delay resolution and accuracy can be improved by increasing the RF modulation frequency $f_m$. The improvement in group delay comes at the expense of wavelength resolution, since the spectral width of the optical signal applied to the DUT is broadened proportionately to $f_m$. A solution to this problem is to use a frequency adjustable RF signal generator and phase meter, e.g. in the form of a single electrical network analyzer, which enables the user to trade-off group delay resolution against wavelength resolution. As a consequence, the optical detectors 96 and 98 would have to have wide bandwidths, which adds to their expense and results in inferior signal to noise ratios relative to receivers optimized for a small range of lower frequencies. In another embodiment of the present invention detailed below, the benefits of a variable modulation frequency $f_m$ are achieved without the need for widely tunable, high frequency RF equipment for the optical modulator 92 and phase detector 98.

Figure 10:
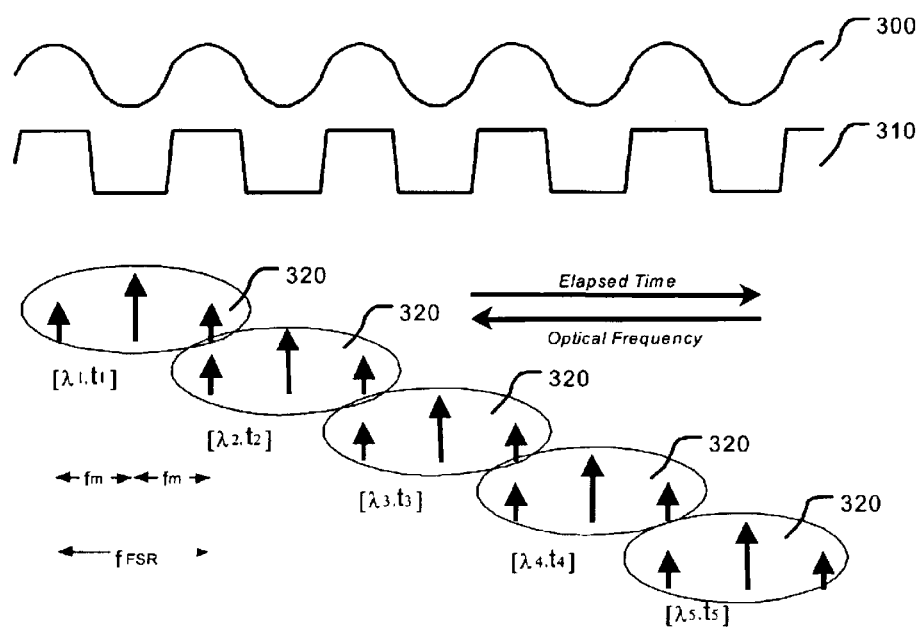
FIG. 10 depicts the optical spectrum at an RF detector of the present invention for an example condition of the modulation frequency.

FIG. 10 illustrates an example condition for the modulation frequency $f_m$. A sinusoidal signal 300 at the top of the figure represents the wavelength-timing signal $S_T$, for example, derived from an etalon being interrogated with a wavelength-sweeping optical source. The horizontal axis represents both optical frequency and time, which are linearly related for a uniformly sweeping source (the wavelength is assumed to be increasing with time in this figure)

The timing signal $S_T$ from the etalon is periodic in optical frequency with the following well-known frequency:

$$f_{FSR} = 2*n*d/c$$

Where c is the speed of light, n is the refractive index and d is the physical spacing between the etalon's reflective surfaces, which is essentially constant.

A squared waveform 310 represents a digital signal derived from the timing signal $S_T$ that is useful for visualizing the timing, where for the purpose of illustration the rising edges can be considered to be the instances in time when phase measurement acquisition occurs.

The ellipses 320 depict the optical spectrum at the RF detector 94 at instances in time, $t_1$ to $t_5$, effectively five spectral snapshots. The spectra each contain a tone at a center wavelength ($\lambda_1$ through $\lambda_5$) as well as an upper and lower side tone separated from the center tone by the modulation frequency $f_m$ as represented by the upwardly pointing arrows. The upper side-tone of one sample occurs at the identical wavelength (optical frequency) of the lower side-tone of an adjacent sample when the following condition holds:

$$f_m = f_{FSR}/2$$

For $f_m > f_{FSR}/2$, the optical spectrum becomes wider than the sample period and the wavelength resolution of the group delay measurements degrades, while if $f_m < f_{FSR}/2$ the optical spectrum is not fully sampled.

The measurements acquired at successive (center) wavelengths (i.e. snapshots) can be averaged to synthesize, i.e. to give a result similar to the use of, a higher value of $f_m$, since the phase contributions from the upper side-band of one acquisition are cancelled by the equal but opposite phase contributions of the lower side-band of an adjacent acquisition. Averaging "n" successive snapshots along the wavelength (optical frequency) axis results in an effective modulation frequency given by:

$$(f_m)_{EFF} = n^* f_m$$

with the effective measurement wavelength given by the mean of wavelengths $$\lambda_{EFF} = \text{mean}(\lambda_i)$$

Figure 11:
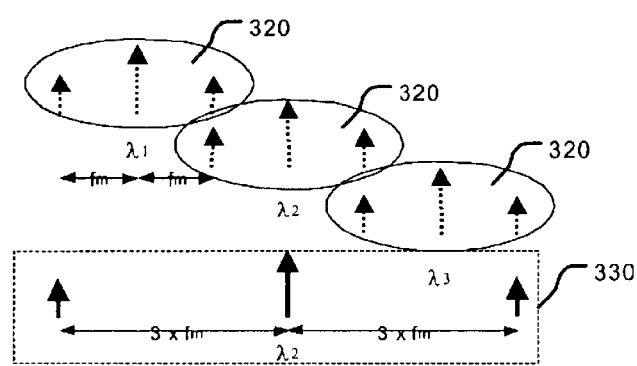
FIG. 11 depicts the optical spectrum at an RF detector of the present invention for the case of three acquisition points.

FIG. 11 illustrates an example case of three acquisition points (snapshots) with ellipses 320 depicting the optical spectrum at the RF detector 94. Applying the technique described above, the three successive snapshots can be averaged resulting in a single equivalent snapshot 330 with an effective modulation frequency $(f_m)_{EFF}$ equal to $3^* f_m$ and an effective (center) wavelength of $\lambda_{EFF}$ equal to $\lambda_2$ (i.e. mean $(\lambda_1, \lambda_2, \lambda_3)$).

This technique can be extended to obtain values $(f_m)_{EFF}$ that are non-integer multiples of $f_m$ by using weighting functions instead of a simple multi-point average, allowing any effective modulation frequency greater than $f_m$ to be synthesized.

To generalize to a non-integer relationship between $f_m$ and $(f_m)_{EFF}$ the emulated sidebands can be located at an arbitrary optical frequency that lies between two integer multiple frequencies (e.g. $(f_m)_{EFF} = (2n+1)f_m$ and $(2n+3)f_m$) by using linear interpolation.

Figure 12:
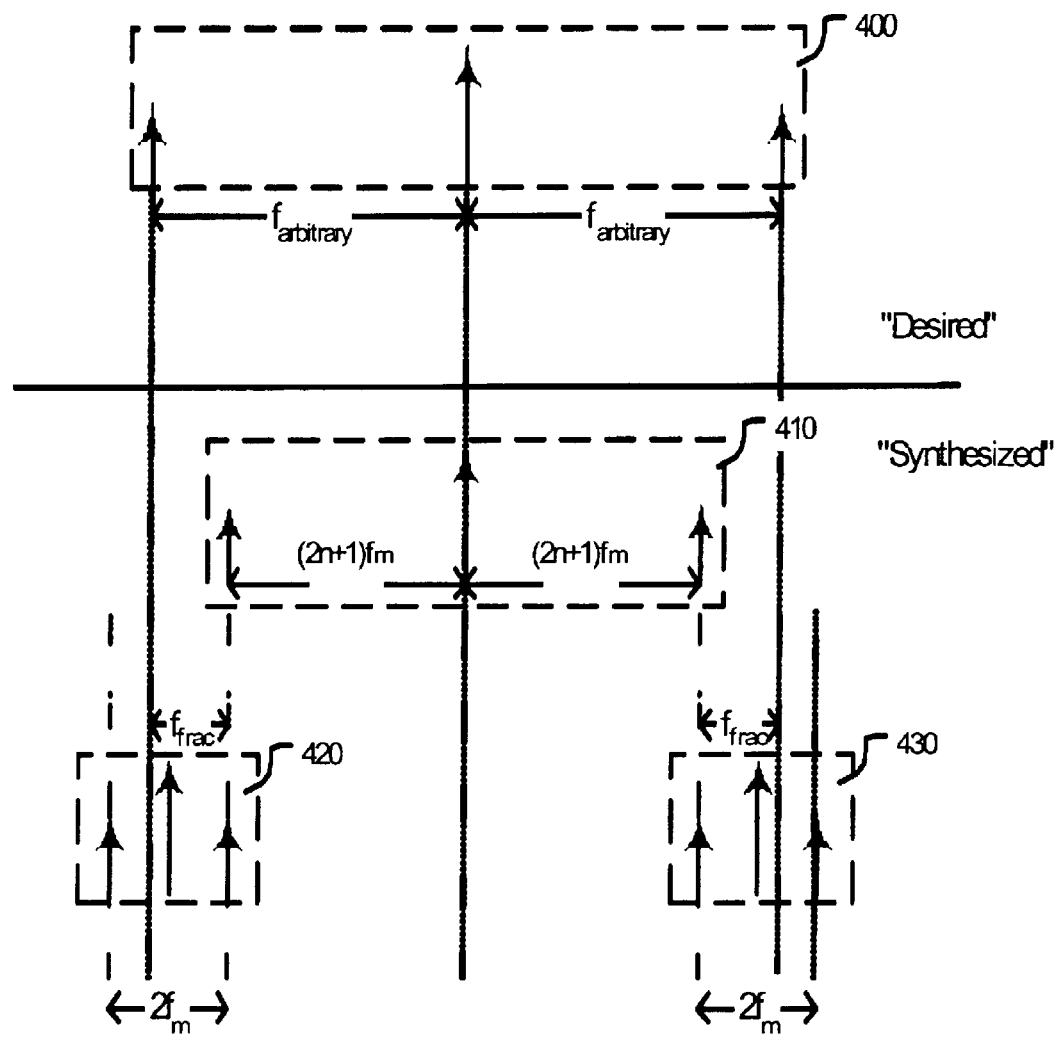
FIG. 12 depicts the relationship between a desired signal spectrum and a synthesized signal spectrum of the present invention.

Referring now to FIG. 12, the top half of the figure, labeled "Desired", depicts a signal 400 with an arbitrary modulation frequency, $f_{arbitrary}$, with no fixed relationship to $f_m$. The bottom portion of the figure, labeled "Synthesized", is constructed from multiple signals, an upper signal 410 represents the largest odd number integer "2n+1" multiple of $f_m$ which is smaller than $f_{arbitrary}$.

The bottom signals 420, 430 represent the spectra of the two next adjacent samples. The frequency $f_{frac}$ is the fractional difference such that:

$$f_{arbitrary} = (2n+1) \times f_m + f_{frac}$$

By the well-known technique of linear interpolation between samples, the correct weighting of the fractional samples of the measured RF phase to be used in numerical processing is given by:

$$W = f_{frac} \div (2f_m) = (f_{arbitrary} - (2n+1) \times f_m) \div (2f_m)$$

By rearranging the above equation the effective modulation frequency, $f_{arbitrary}$, can be expressed as:

$$f_{arbitrary} = (2n + 1 + 2W)f_m$$

Figure 16:
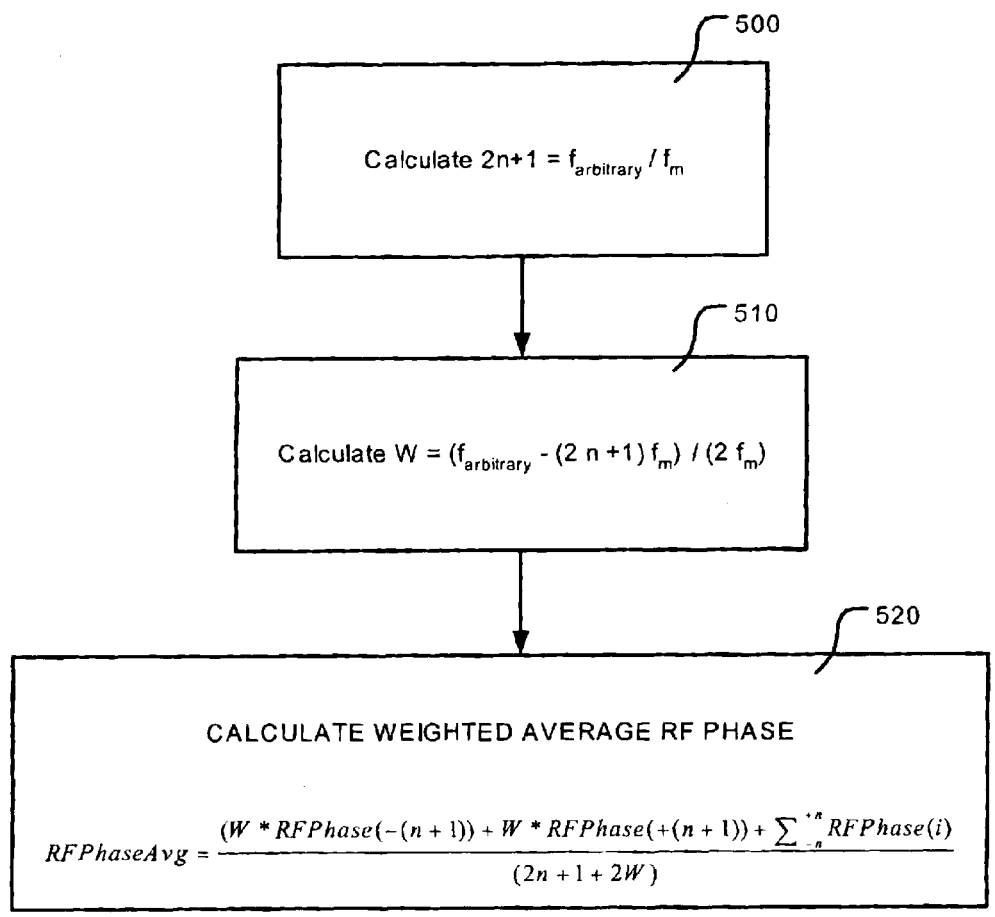
FIG. 16 represents a flowchart according to a method of the present invention for calculating the equivalent group delay measured at an arbitrary effective modulation frequency.

FIG. 16 represents a flowchart for a method for calculating, by way of a weighted average, the equivalent phase measured at an arbitrary effective modulation frequency according to the method of the present invention. The first step 500 is to determine '2n+1' the integer value of the quotient of $f_{arbitrary}$ and $f_m$. The value of '2n+1' represents the largest integer multiple of $f_m$ that is less than $f_{arbitrary}$. The next step 510 is to calculate 'W' the weighting coefficient to be applied to the component represented by the difference between $f_{arbitrary}$ and '$(2n+1)^* f_m$'. Using the linear interpolation method the weight 'W' is the difference between $f_{arbitrary}$ and $(2n+1)^* f_m$, i.e. $(f_{arbitrary} - (2n+1) \times f_m)$, and the weight of a standard measurement interval $(2^* f_m)$. The last step 520 is to calculate the weighted average group delay RF phase for an effective modulation frequency of $f_{arbitrary}$ using the linear interpolation method resulting in:

$$RFPhaseAvg = \frac{\left(W * RFPhase(-(n+1)) + W * RFPhase(+(n+1)) + \sum_{-n}^{+n} RFPhase(i)\right)}{(2n + 1 + 2W)}$$

Where RFPhase $(-(n+1))$ and RFPhase $(+(n+1))$ correspond to the left-most and right-most samples in FIG. 12 and the change in group delay, RF phase, is approximately linear over a frequency span of $2 \times f_m$. The summation of group delays, RFPhase(i), is over all of the intermediate $(2n+1)$ samples.

Figure 13:
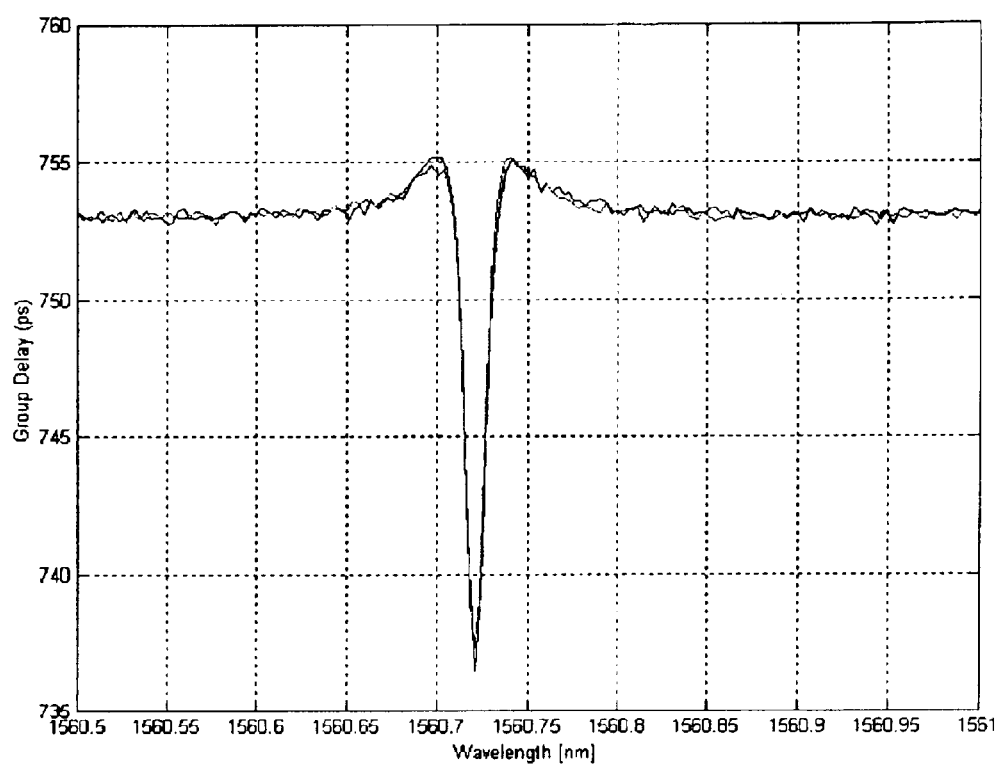
FIG. 13 illustrates empirical group delay curves for measurements on a NIST HCN test cell using a low modulation frequency.

Measurements have been made using the method of effective modulation frequency synthesis described above and results are present here. The data comes from two sources, both for measurements on the same National Institute of Standards and Technology (NIST) hydrogen cyanide (HCN) cell, also known as NIST Standard Reference Material 2519, as follows:

(1) Testing on an Advantest Q7750 optical network analyzer:
   Modulation freq: 200 MHz.
   Modulation freq: 2 GHz.
(2) Testing on a JDS Uniphase swept wavelength chromatic dispersion (SWS-CD) optical component test system:
   Modulation Freq: 192 MHz FIG. 13 illustrates empirical group delay curves from measurements on the NIST HCN cell using a low modulation frequency. A trace 600 in the graph represents the measurements taken by the Advantest 7750 with a $f_m$ of 200 MHz. A trace 610 in the graph represents the measurements taken with SWS-CD with a $f_m$ of 192 MHz. It can be seen from the graph that the results for the two measurement sources with approximately the same low modulation frequency (200 MHz vs. 192 MHz) are highly correlated. This indicates that for the same (or approximately the same) modulation frequency both the Advantest Q7750 and the SWS-CD generate similar results.

Figure 14:
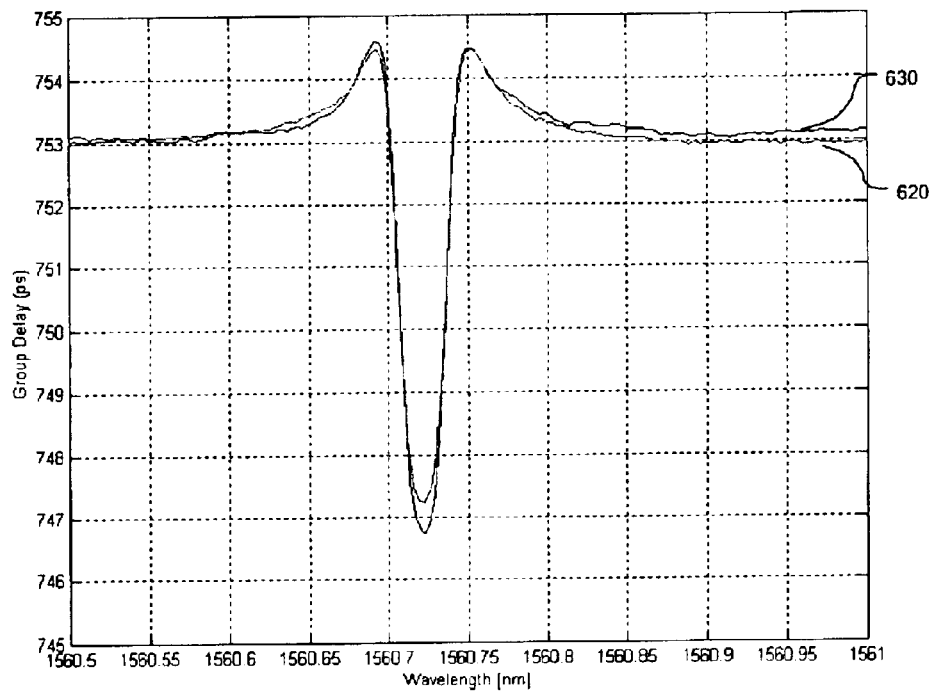
FIG. 14 illustrates empirical group delay curves for measurements on a NIST HCN test cell using a high modulation frequency.
Figure 15:
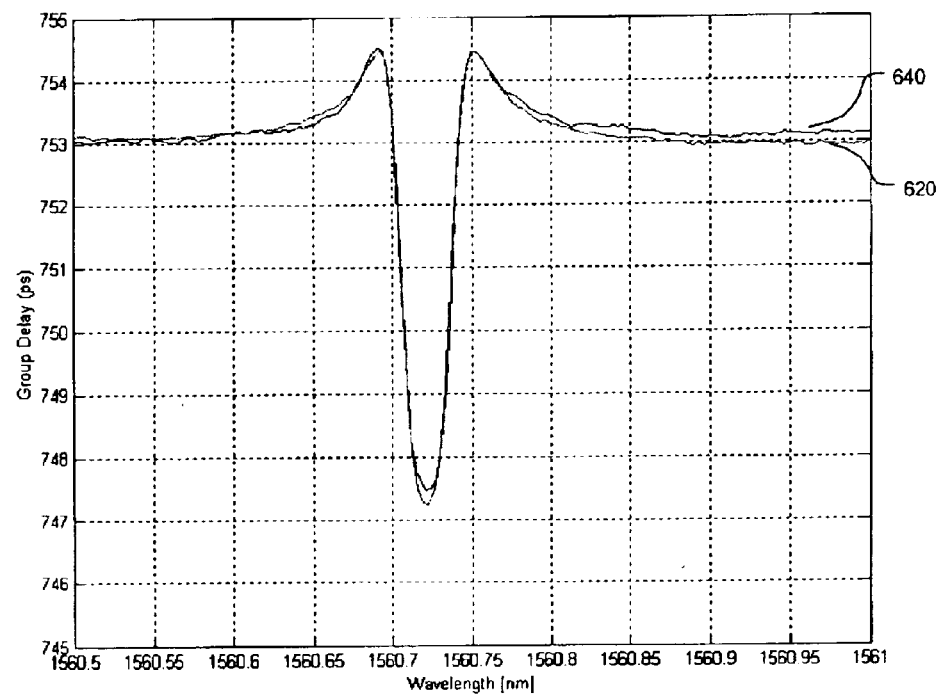
FIG. 15 illustrates empirical group delay curves for another set of measurements on a NIST HCN test cell using a high modulation frequency.

FIGS. 14 and 15 illustrate empirical group delay curves for the NIST HCN cell using a high modulation frequency. In both FIGS. 14 and 15 a trace 620 in the graph represents the measurements taken by the Advantest 7750 with a $f_m$ of 2.0 GHz. Using the synthesized effective modulation frequency method with the SWS-CD at a $f_m$ of 192 MHz, effective modulation frequencies of 1.92 GHz and 2.11 GHz can be achieved by averaging over 10 and 11 sample measurements respectively. These two effective frequencies of modulation are close approximations for a $f_m$ of 2.0 GHz and effectively bracket that $f_m$. In FIG. 14 a trace 630 in the graph represents the measurements taken with SWS-CD with a $f_m$ of 192 MHz, averaged over 10 sample measurements, i.e. GD2(i)=(GD1(i-5)+GD1(i-4)+GD1(i-3)+GD1(i-2)+GD1(i-1)+GD1(i) +GD1(i+1)+GD1(i+2)+GD1(i+3)+GD1(i+4))/10 for a $(f_m)_{EFF}$ of 1.92 GHz. In FIG. 15 a trace 640 in the graph represents the measurements taken with SWS-CD with a $f_m$ of 192 MHz, averaged over 11 sample measurements (i.e. GD2(i)=(GD1(i−5)+GD1(i−4)+GD1(i−3)+GD1(i−2)+GD1(i−1)+GD1(i)+GD1(i+1)+GD1(i+2)+GD1(i+3) +GD1(i+4)+GD1(i+5))/11) for a $(f_m)_{EFF}$ of 2.11 GHz. It can be seen from the graphs in both FIGS. 14 and 15 that the results for the two measurement sources with approximately the same high modulation frequency (2.0 GHz) or effective modulation frequency (192 GHz and 2.11 GHZ) are highly correlated. These results validate that the method of effective modulation frequency synthesis can provide Group Delay measurements that are similar to those resulting from a traditional GD measurement technique for a given modulation frequency while using an actual $f_m$ that is substantially lower.

In comparing the low $f_m$ results in FIG. 13 with the high $f_m$ results in FIGS. 14 and 15 it can be seen that in the case of both an actual high $f_m$ and a high effective $f_m$ a significant improvement in group-delay noise and resolution has been gained, although at the expense of wavelength resolution. It is also clear that the use of a synthesized, "effective" modulation frequency is both useful and representative of using the corresponding actual modulation frequency.

The method of the present invention provides for determining, using the conventional modulation phase technique, the group delay response characteristics of an optical component by taking multiple, successive spaced-apart (in wavelength) measurements for a given modulation frequency $f_m$ and by 'weighted averaging' of the multiple, spaced-apart measurements, determining a result substantially equivalent to the result of a single measurement at the average center wavelength of the multiple, successive spaced-apart measurements and with an effective modulation frequency that is an arbitrary multiple of $f_m$. Thereby, synthesizing the effective modulation frequency.

Figure 17:
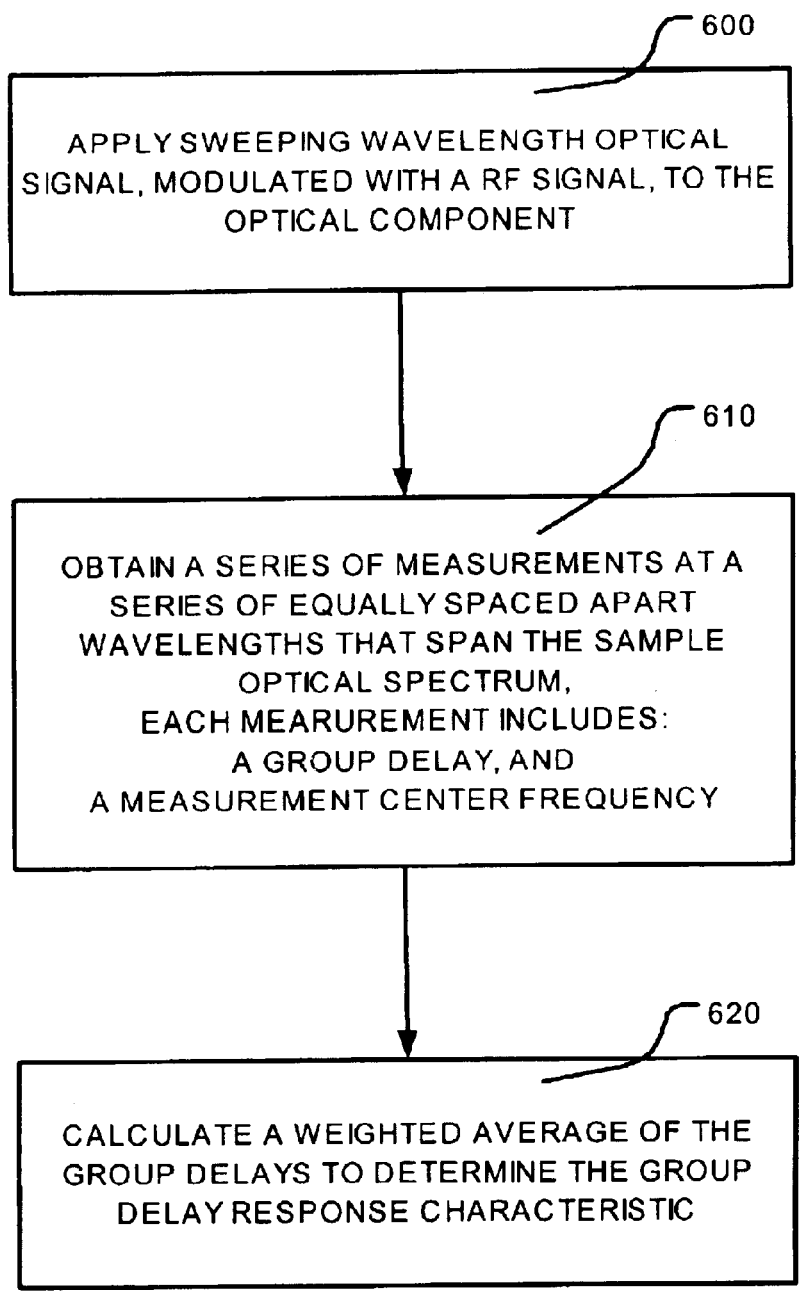
FIG. 17 represents the steps in a method of the present invention for synthesizing an effective modulation frequency in determining a group delay response characteristic of an optical component over a sample optical spectrum.

FIG. 17 represents the steps in a method of the present invention for synthesizing an effective modulation frequency in determining a group delay response characteristic of an optical component (i.e. DUT) over a sample optical spectrum. The first step 600 is to apply a sweeping wavelength optical signal modulated with a RF signal, such as for example the test signal output by block 30 in FIG. 9, to the optical component. Next a series of measurements are obtained 610 at a series of equally spaced apart wavelengths swept by the sweeping wavelength optical signal and that span the sample optical spectrum. Each measurement includes: a group delay determined from a reference phase derived from the sweeping wavelength optical signal and an output phase derived from the output signal of the optical component; and a measurement center frequency representing the frequency of the sweeping wavelength optical signal when the measurement is taken. A weighted average of the group delays included in the series of measurements is calculated 620 to determine the group delay response characteristic. The weights used in the weighted average relate to the portion of the sample optical spectrum that is sampled by each of the series of measurements such that the synthesized effective modulation frequency is equal to the product of the sum of the weights and the frequency of the RF signal.

Of course numerous other embodiments can be envisaged without departing from the spirit and scope of the invention.

We claim:

1. An apparatus for testing an optical component comprising;
    a tunable laser for providing a tunable laser signal having a wavelength that varies with time;
    a first modulator for modulating the tunable laser signal producing a modulated laser signal defined by a frequency;
    an information signal generator for generating an information signal having an indicator that varies with the variations in wavelength of the tunable laser signal;
    a test station for receiving the modulated laser signal, and for testing the optical component therewith, providing a plurality of test information samples including an initial and a final phase measurement of the modulated laser signal taken before and after passing through the optical component, respectively, to calculate group delay measurements at various times and corresponding wavelengths;
    a correlator for correlating the plurality of test information samples with the information signal to determine the wavelength corresponding to each test information sample independent of the specific optical component.

2. The apparatus according to claim 1, further comprising a polarization controller for controlling a polarization of the modulated laser signal.

3. The apparatus according to claim 2, wherein the wavelength of the tunable laser signal increases or decreases between a first wavelength and a second wavelength defining a sweep; and wherein the polarization controller changes the polarization of the modulated laser signal after successive sweeps; whereby the group delay measurements at each polarization are used to calculate a differential group delay.

4. The apparatus according to claim 1, wherein a first portion of the tunable laser signal is tapped therefrom for use by the information signal generator in generating the information signal.

5. The apparatus according to claim 1, wherein the information signal generator comprises:
    interferometer means for providing the information signal a periodic response with a predetermined free spectral range indicative of incremental wavelength and timing information; and
    a marker for providing an indication of when the tunable laser signal is at a predetermined wavelength.

6. The apparatus according to claim 5, wherein the information signal generator further comprises a second modulator for generating a modulated information signal indicative of an incremental increase in time and wavelength of the tunable laser signal; wherein the modulated information signal comprises an optical signal having a wavelength outside the wavelengths of the tunable laser signal; and wherein a WDM filter combines the modulated information signal with the modulated laser signal for transmission to the test station.

7. The apparatus according to claim 6, further comprising:
    a first splitter for splitting the modulated information signal combined with the modulated laser signal into at least two portions;
    at least one additional test station, each additional test station for receiving one of the portions of the modulated information signal combined with modulated laser signal, and for testing additional optical components.

8. The apparatus according to claim 1, wherein the test station includes a phase detector for determining the group delay based on the initial and final phase measurements, and the frequency of the modulated laser signal.

9. The apparatus according to claim 8, wherein the phase detector determines an average group delay over a series of successive test information samples based on an effective frequency of the modulated laser signal; wherein the effective frequency is a multiple of the frequency of the modulated laser signal.

10. The apparatus according to claim 9, wherein the information signal is a periodic information signal defined by a frequency, the periodic information signal indicative of an incremental change in time and wavelength of the tunable laser signal; wherein the test station obtains a test information sample after each incremental change; wherein the phase detector determines an average group delay over an odd number of successive test information samples; and wherein the effective frequency is an integer multiple of the frequency of the modulated laser signal, whereby the initial and final phase measurements of the successive test information samples cancel each other out, except a first initial phase measurement and a last final phase measurement used to calculate the average group delay.

11. The apparatus according to claim 9, wherein the information signal is a periodic information signal defined by a frequency, the periodic information signal indicative of an incremental change in time and wavelength of the tunable laser signal; wherein the test station obtains a test information sample after each incremental change; wherein the phase detector determines an average group delay over any number of successive test information samples; and wherein the effective frequency is a multiple of the frequency of the modulated laser signal, whereby a first initial phase measurement and a last final phase measurement used to calculate the average group delay are calculated using linear interpolation techniques.

12. The apparatus according to claim 3, wherein the test station includes:
   a tap for separating a first portion of the modulated laser signal from a remainder of the modulated laser signal before entry into the optical component;
   a first detector for receiving the first portion, and providing a preliminary power intensity reading;
   a second detector for receiving at least a portion of the remainder of the modulated laser signal after passage through the optical component, and for providing a final power intensity reading; and
   wherein an insertion loss measurement for each wavelength is determined from the preliminary and final power intensity readings.

13. The apparatus according to claim 12, wherein the polarization controller changes the polarization of the modulated laser signal after successive sweeps; whereby the insertion loss measurements at each polarization are used to calculate a polarization dependent loss.

14. A method for testing an optical component, comprising the steps of:
   a) providing a first optical signal that varies in wavelength over time;
   b) generating a second signal that has an indication therein related to variations in wavelength and time of the first optical signal;
   c) modulating the first optical signal providing a modulated optical signal defined by a frequency;
   d) testing the optical component with at least a portion of the modulated optical signal to acquire test information comprising initial and final phase measurements for calculating group delay measurements at a plurality of wavelengths;
   e) deriving wavelength information relating to the first optical signal, or a signal derived therefrom, from the second signal; and
   f) correlating the acquired test information with the derived wavelength information to match the test information with a corresponding wavelength independent of the optical component.

15. The method according to claim 14, wherein step b) includes:
   tapping a first portion of the first optical signal;
   providing the first portion to an interferometric device, with a predetermined free spectral range, for generating a periodic response;
   tapping a second portion of the first optical signal;
   providing the second portion to a marker for providing an indication of when the first optical signal has a predetermined wavelength.

16. The method according to claim 15, wherein step b) further comprises generating a pulsed modulation signal from the first portion indicative of an incremental increase in time and wavelength of the first optical signal; and wherein step d) includes acquiring test information corresponding to each pulse in the pulsed modulation signal.

17. The method according to claim 16, wherein step d) also includes:
   tapping a first portion of the modulated optical signal;
   determining an initial phase of the modulated optical signal from the first portion of the modulated optical signal; and
   determining a final phase of the modulated optical signal from the modulated optical signal after passing through the optical component.

18. The method according to claim 17, wherein the wavelength of the tunable laser signal increases or decreases between a first wavelength and a second wavelength defining a sweep; and
   wherein step d) includes changing the polarization of the modulated laser signal after successive sweeps; whereby the group delay measurements at each polarization are used to calculate a differential group delay.

19. The method according to claim 18, wherein step d) also includes:
   tapping a second portion of the modulated optical signal;
   measuring an intensity of the second portion of the modulated optical signal;
   measuring an intensity of the modulated optical signal after passing through the optical component; and
   calculating insertion loss based on the intensity of the second portion and the intensity of the modulated optical signal after passing through the optical component at the plurality of wavelengths.

20. The method according to claim 19, wherein step d) also includes changing the polarization of the modulated optical signal after successive sweeps; whereby the insertion loss measurements at each polarization are used to calculate a polarization dependent loss for each wavelength.

21. The method according to claim 14, wherein step d) includes determining the group delay at each wavelength based on the initial and final phase measurements, and the frequency of the modulated optical signal.

22. The method according to claim 21, wherein step d) includes determining an average group delay over a series of successive test information samples based on an effective frequency of the modulated optical signal; wherein the effective frequency is a multiple of the frequency of the modulated optical signal.

23. The method according to claim 22, wherein the second signal is a periodic information signal defined by a frequency, the periodic information signal indicative of an incremental change in time and wavelength of the first optical signal; wherein step d) includes obtaining a test information sample after each incremental change; wherein step d) includes determining an average group delay over an odd number of successive test information samples; and wherein the effective frequency is an integer multiple of the frequency of the modulated optical signal, whereby the initial and final phase measurements of the successive test information samples cancel each other out, except a first initial phase measurement and a last final phase measurement.

24. The apparatus according to claim 22, wherein the information signal is a periodic information signal defined by a frequency, the periodic information signal indicative of an incremental change in time and wavelength of the first optical signal; wherein step d) includes obtaining a test information sample after each incremental change; wherein step d) includes determining an average group delay over any number of successive test information samples; and wherein the effective frequency is a multiple of the frequency of the modulated optical signal, whereby a first initial phase measurement and a last final phase measurement are calculated using linear interpolation techniques on the obtained test information samples.

* * * * *